US012556902B2

(12) United States Patent
Sedlacek et al.

(10) Patent No.: US 12,556,902 B2
(45) Date of Patent: Feb. 17, 2026

(54) NOTIFICATION OF DISASTER CONDITION AND ALTERNATIVE PLMNS

(71) Applicant: Telefonaktiebolaget LM Ericsson (publ), Stockholm (SE)

(72) Inventors: Ivo Sedlacek, Hovorcovice (CZ); Mikael Wass, Sätila (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 18/035,428

(22) PCT Filed: Nov. 5, 2021

(86) PCT No.: PCT/IB2021/060283
§ 371 (c)(1),
(2) Date: May 4, 2023

(87) PCT Pub. No.: WO2022/097096
PCT Pub. Date: May 12, 2022

(65) Prior Publication Data
US 2023/0403547 A1  Dec. 14, 2023

Related U.S. Application Data

(60) Provisional application No. 63/110,215, filed on Nov. 5, 2020.

(51) Int. Cl.
*H04W 8/12*  (2009.01)
*H04W 60/04*  (2009.01)
(Continued)

(52) U.S. Cl.
CPC ............ *H04W 8/12* (2013.01); *H04W 60/04* (2013.01); *H04W 76/50* (2018.02); *H04W 84/042* (2013.01)

(58) Field of Classification Search
CPC ....... H04W 8/02; H04W 24/04; H04W 88/06; H04W 48/12; H04W 48/18; H04W 60/005; H04W 8/08
(Continued)

(56) References Cited

U.S. PATENT DOCUMENTS

| 2020/0084741 A1* | 3/2020 | Chun | ................... H04W 12/08 |
| 2022/0070815 A1* | 3/2022 | Chun | ..................... H04W 8/02 |

FOREIGN PATENT DOCUMENTS

| EP | 2445244 A1 | 4/2012 |
| EP | 3525520 A1 | 8/2019 |

(Continued)

OTHER PUBLICATIONS

Author Unknown, "Technical Specification Group Core Network and Terminals; Technical realization of Cell Broadcast Service (CBS) (Release 17)," Technical Specification 23.041, Version 17.0.0, Sep. 2020, 3GPP Organizational Partners, 100 pages.

(Continued)

Primary Examiner — Maria El-Zoobi
(74) Attorney, Agent, or Firm — Sonoda & Kobayashi Intellectual Property Law; Darren M. Gardner

(57) ABSTRACT

Systems and methods for enabling notification of disaster conditions and alternative Public Land Mobile Networks (PLMNs) to network nodes are disclosed. In one embodiment, a method performed by a User Equipment (UE) for responding to a disaster condition in a first PLMN, comprises determining that a first PLMN is not available; determining that a second PLMN is available for disaster roaming; and attempting to register with the second PLMN, responsive to determining that the first PLMN is not available due to the disaster condition and determining that a second PLMN is available for disaster roaming. In this way, a UE is informed of the failure of its currently used PLMN (Continued)

due to a disaster condition and a service may be provided in another PLMN, where the UE under normal conditions may not be allowed to receive a service from the second PLMN.

12 Claims, 10 Drawing Sheets

(51) Int. Cl.
*H04W 76/50* (2018.01)
*H04W 84/04* (2009.01)

(58) Field of Classification Search
USPC .................................................. 455/404.1
See application file for complete search history.

(56) References Cited

FOREIGN PATENT DOCUMENTS

| | | | |
|---|---|---|---|
| EP | 3905737 A1 | 11/2021 | |
| WO | WO2020204309 * | 2/2019 | ............ H04W 24/04 |
| WO | 2020141956 A1 | 7/2020 | |
| WO | 2020141965 A1 | 7/2020 | |
| WO | 2020204309 A1 | 10/2020 | |
| WO | 2022097098 A1 | 5/2022 | |

OTHER PUBLICATIONS

Author Unknown, "Technical Specification Group Core Network and Terminals; Non-Access-Stratum (NAS) functions related to Mobile Station (MS) in idle mode (Release 17)," Technical Specification 23.122, Version 17.0.0, Sep. 2020, 3GPP Organizational Partners, 83 pages.

Author Unknown, "Technical Specification Group Core Network and Terminals; Non-Access Stratum (NAS) protocol for Evolved Packet System (EPS); Stage 3 (Release 17)," Technical Specification 24.301, Version 17.0.0, Sep. 2020, 3GPP Organizational Partners, 585 pages.

Author Unknown, "Technical Specification Group Core Network and Terminals; Non-Access-Stratum (NAS) protocol for 5G System (5GS); Stage 3; (Release 17)," Technical Specification 24.501, Version 17.0.0, Sep. 2020, 3GPP Organizational Partners, 728 pages.

Author Unknown, "Technical Specification Group Core Network and Terminals; Access to the 3GPP 5G Core Network (5GCN) via Non-3GPP Access Networks (N3AN); Stage 3 (Release 17)," Technical Specification 24.502, Version 17.0.0, Sep. 2020, 3GPP Organizational Partners, 88 pages.

Author Unknown, "Technical Specification Group Radio Access Network; NR; NR and NG-RAN Overall Description; Stage 2 (Release 16)," Technical Specification 38.300, Version 16.3.0, Sep. 2020, 3GPP Organizational Partners, 148 pages.

Ericsson, "C1-20xxxx: MINT: solutions for all key issues," 3GPP TSG-CT WG1 Meeting #126-e, Oct. 15-23, 2020, Electronic Meeting, 7 pages.

Ericsson, "C1-20xxxx: MINT: alternative 1 for How do other PLMNs indicate that they can accept Disaster Inbound Roamers," 3GPP TSG-CT WG1 Meeting #126-e, Oct. 15-23, 2020, Electronic Meeting, 2 pages.

Ericsson, "C1-20xxxx: MINT: alternative 2 for How do other PLMNs indicate that they can accept Disaster Inbound Roamers," 3GPP TSG-CT WG1 Meeting #126-e, Oct. 15-23, 2020, 2 pages.

Ericsson, "C1-20xxxx: MINT: solution for How are UEs/subscribers notified that a Disaster Condition applies," 3GPP TSG-CT WG1 Meeting #126-e, Oct. 15-23, 2020, Electronic Meeting, 1 page.

Ericsson, "C1-20xxxx: MINT: solution for How can UE/subscribers perform network selection for disaster roaming," 3GPP TSG-CT WG1 Meeting #126-e, Oct. 15-23, 2020, Electronic Meeting, 1 page.

International Search Report and Written Opinion for International Patent Application No. PCT/IB2021/060283, mailed Feb. 9, 2022, 17 pages.

Written Opinion for International Patent Application No. PCT/IB2021/060283, mailed Oct. 4, 2022, 8 pages.

International Preliminary Report on Patentability for International Patent Application No. PCT/IB2021/060283, mailed Jan. 30, 2023, 30 pages.

Qualcomm Incorporated, "C1-205944: Key Issues for MINT," 3GPP TSG CT WG1 Meeting #126-e, Oct. 15-23, 2020, Electronic Meeting, 3 pages.

International Search Report and Written Opinion for International Patent Application No. PCT/IB2021/060285, mailed Jan. 19, 2022, 20 pages.

\* cited by examiner

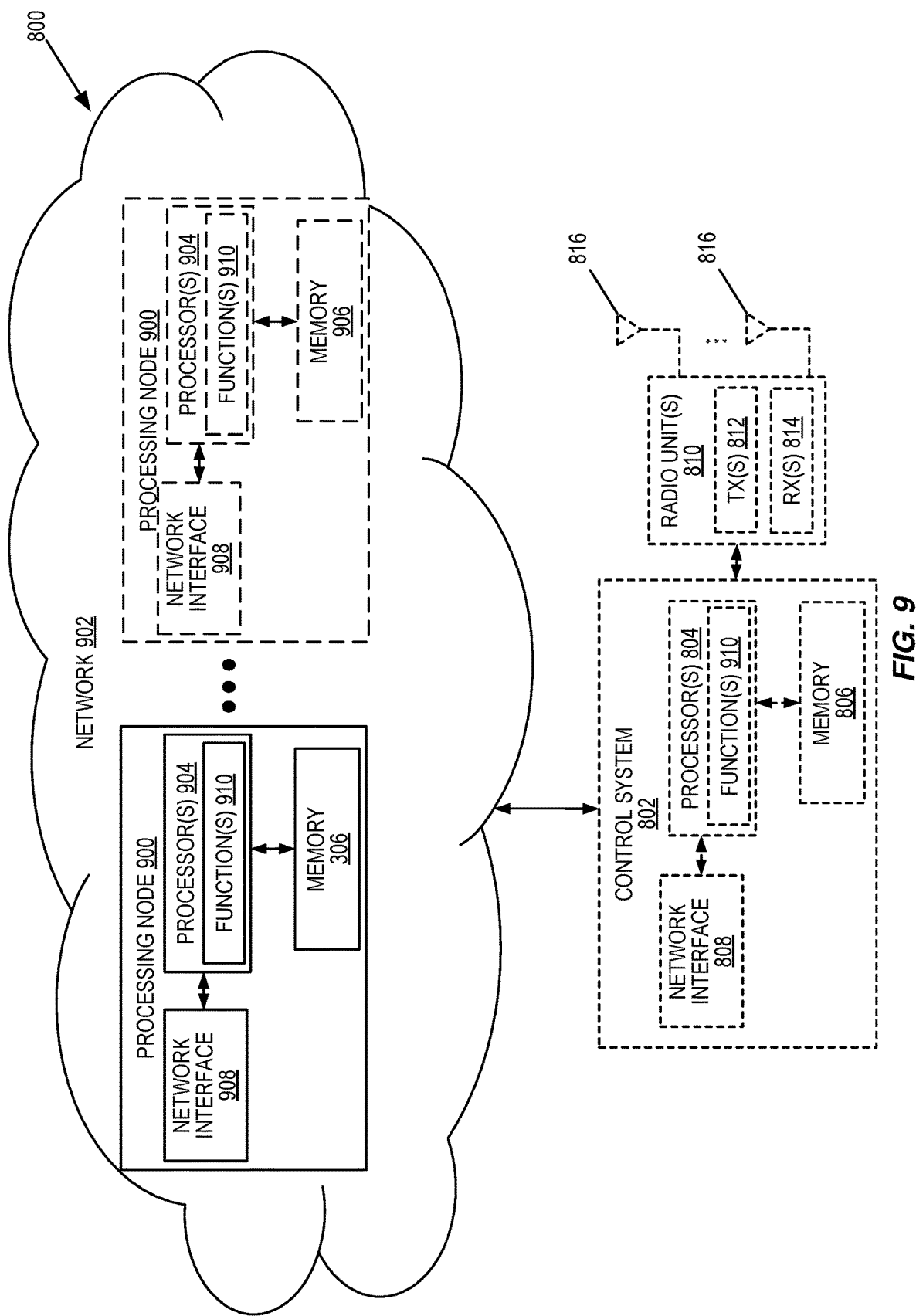

NOTIFICATION OF DISASTER CONDITION AND ALTERNATIVE PLMNS

RELATED APPLICATIONS

This application is a 35 U.S.C. § 371 national phase filing of International Application No. PCT/IB2021/060283, filed Nov. 5, 2021, which claims the benefit of provisional patent application Ser. No. 63/110,215, filed Nov. 5, 2020, the disclosures of which are hereby incorporated herein by reference in their entireties.

TECHNICAL FIELD

The present disclosure relates to enabling notification of disaster conditions, e.g. earthquake, tsunami, or landslide, in a first Public Land Mobile Network (PLMN) and an alternative PLMN to network nodes and a User Equipment (UE).

BACKGROUND

High availability of the Fifth Generation (5G) system has been discussed in Third Generation Partnership Project (3GPP), and it has been decided to perform a study to seek solutions to minimize service interruption in case of disaster conditions impacting a Public Land Mobile Network (PLMN). Solutions that enable User Equipments (UEs) using a PLMN failing service due to disaster condition to receive service using alternative PLMNs are to be studied. In this regard, at 3GPP TSG-CT WG1 Meeting #126-e (Electronic meeting; 15-23 Oct. 2020), the following documents were submitted: (1) "MINT: solutions for all key issues"; (2) "MINT: alternative 2 for How do other PLMNs indicate that they can accept 'Disaster Inbound Roamers'?"; (3) "MINT: solution for How can UE/subscribers perform network selection for disaster roaming?"; (4) "MINT: alternative 1 for How do other PLMNs indicate that they can accept 'Disaster Inbound Roamers'?"; and (5) "MINT: solution for How are UEs/subscribers 5 notified that a 'Disaster Condition' applies?" The intention of the study is to identify solutions that can be introduced in the 3GPP standard. Thus, there are no existing solutions for the use cases of the study in the current baseline 3GPP 5G system.

SUMMARY

Embodiments of enabling notification of disaster conditions and alternative Public Land Mobile Networks (PLMNs) to network nodes are disclosed. In one embodiment, a method performed by a User Equipment (UE) for responding to a disaster condition in a first PLMN, comprises determining that a first PLMN is not available due to a disaster condition; determining that a second PLMN is available for disaster roaming; and attempting to register with the second PLMN, responsive to determining that the first PLMN is not available due to the disaster condition and determining that a second PLMN is available for disaster roaming. In this way, a UE is informed of the failure of its currently used PLMN due to a disaster condition and a service may be provided in another PLMN, where the UE under normal conditions may not be allowed to receive a service from the another PLMN.

In one embodiment, the method further comprises receiving a disaster roaming PLMN list from the second PLMN. The disaster roaming PLMN list comprises a PLMN Identifier (ID) of the first PLMN.

In one embodiment, receiving the disaster roaming PLMN list comprises receiving the disaster roaming PLMN list in a broadcast on a cell in the second PLMN (PLMN X).

In one embodiment, receiving the disaster roaming PLMN list comprises receiving the disaster roaming PLMN list in a public warning system (PWS) message from a cell in the second PLMN.

In one embodiment, determining that the second PLMN is available for disaster roaming comprises determining that the second PLMN is available for disaster roaming based on the disaster roaming PLMN list.

In one embodiment, determining that the first PLMN is not available due to the disaster condition comprises: determining that there is no available cell of the first PLMN (PLMN Y) and determining that a PLMN Identifier (ID) of the first PLMN is comprised in the disaster roaming PLMN list.

In one embodiment, determining that the first PLMN is not available due to the disaster condition comprises: transmitting a registration request to the first PLMN; not receiving a response to the registration request; and determining that a PLMN Identifier, ID, of the first PLMN is comprised in the disaster roaming PLMN list.

In one embodiment, determining that the first PLMN is not available due to a disaster condition comprises transmitting a registration request to the first PLMN and receiving a rejection of the registration request comprising an indication of the disaster condition.

In one embodiment, determining that the first PLMN is not available due to the disaster condition comprises transmitting a service request to the first PLMN; not receiving a response to the service request; and determining that a PLMN Identifier (ID) of the first PLMN is comprised in the disaster roaming PLMN list.

In one embodiment, determining that the first PLMN is not available due to the disaster condition comprises transmitting a service request to the first PLMN and receiving a rejection of the service request comprising an indication of the disaster condition.

In one embodiment, determining that the first PLMN is not available due to the disaster condition comprises camping on a cell of the first PLMN and receiving a broadcast on the cell that comprises information that indicates that a disaster condition exists on the first PLMN.

In one embodiment, determining that the first PLMN is not available due to a disaster condition comprises transmitting a registration request to the first PLMN and receiving a registration reject from the first PLMN including a message of Fifth Generation System Mobility Management (5GMM) #XXX disaster condition identified.

In one embodiment, determining that the first PLMN is not available due to the disaster condition comprises transmitting a service request to the first PLMN and receiving a service reject from the first PLMN including a message of Fifth System Mobility Management (5GMM) #XXX disaster condition identified.

In one embodiment, the UE is not otherwise permitted to use the second PLMN.

Corresponding embodiment of a UE is also disclosed. A UE comprises one or more transmitters, one or more receivers and processing circuitry associated with the one or more transmitters and the one or more receivers. The processing circuitry is configured to cause the UE to determine that a first PLMN is not available due to a disaster condition, determine that a second PLMN is available for disaster roaming, and attempt to register with the second PLMN, responsive to determining that the first PLMN is not available due to the disaster condition and determining that a second PLMN is available for disaster roaming.

Corresponding embodiments of a Radio Access Network (RAN) node and methods performed by the RAN node are also disclosed.

In one embodiment, a method performed by a Radio Access Network (RAN) node of a second PLMN, comprises transmitting disaster roaming PLMN list comprising a PLMN Identifier (ID) of a first PLMN for which the second PLMN is available to provide a disaster roaming.

In one embodiment, transmitting the disaster roaming PLMN list comprises broadcasting information comprising the disaster roaming list in a corresponding cell of the second PLMN.

In one embodiment, transmitting the disaster roaming PLMN list comprises broadcasting a Public Warning System (PWS) message comprising the disaster roaming PLMN list in a corresponding cell of the second PLMN.

In one embodiment, the PWS message further comprises a message identifier that is set to a value that indicates that the second PLMN is available for the disaster roaming.

In one embodiment, the method further comprises receiving a registration request from a UE that desires to use the second PLMN for the disaster roaming and processing the registration request such that the UE is allowed to use the second PLMN.

In one embodiment, a RAN node is adapted to transmit a disaster roaming PLMN list comprising a PLMN Identifier (ID) of a first PLMN for which a second PLMN is available to provide a disaster roaming.

In one embodiment, a RAN node comprising processing circuitry configured to cause the RAN node to transmit a disaster roaming PLMN list comprising a PLMN Identifier (ID) of a first PLMN for which a second PLMN is available to provide a disaster roaming.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 illustrates a schematic block diagram that illustrates a virtualized embodiment of a network node according to some embodiments of the present disclosure.

DETAILED DESCRIPTION

Figure 1:
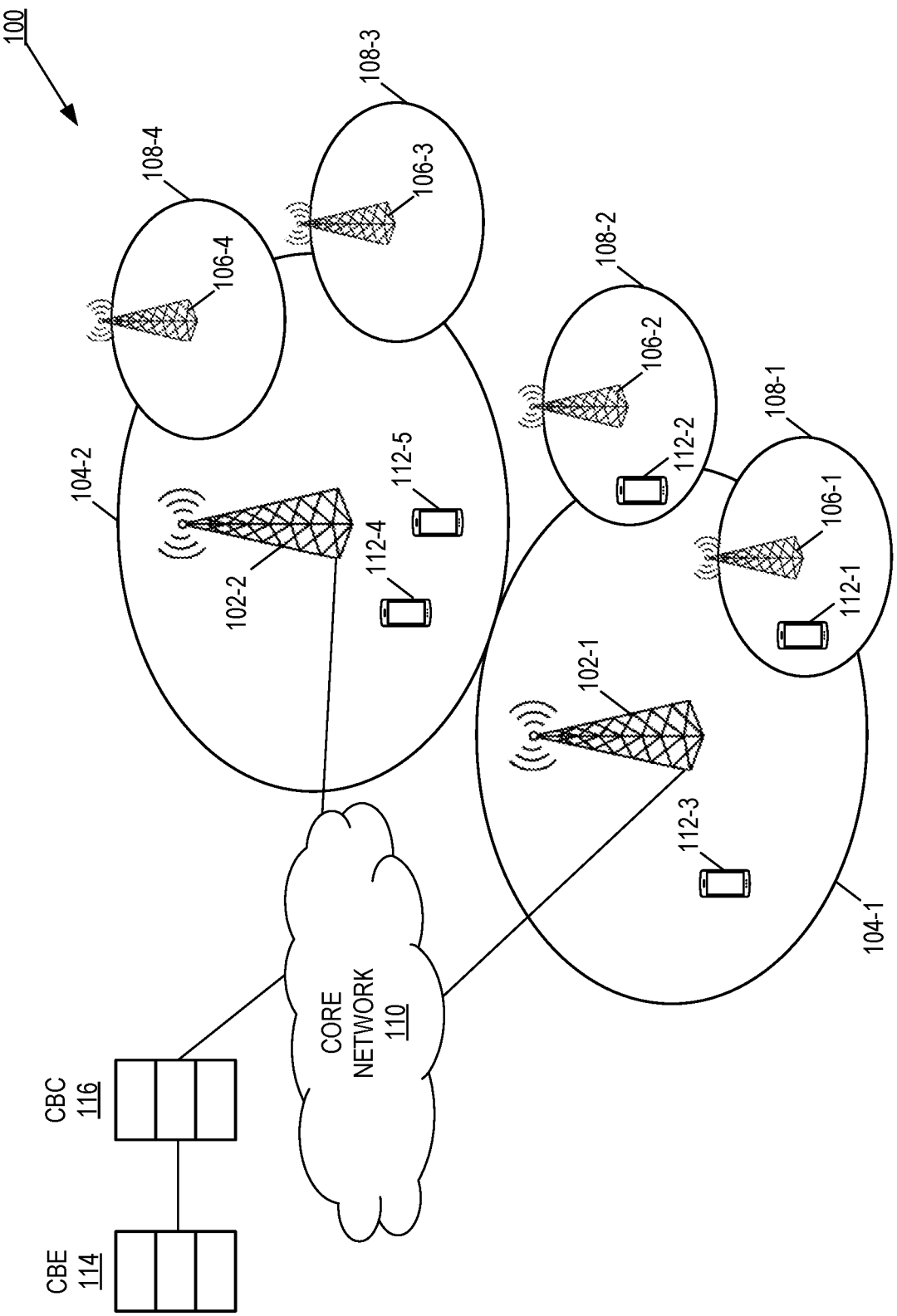
FIG. 1 illustrates one example of a cellular communications system in accordance with the embodiments in the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a UE in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In the above-described document titled "MINT: solutions for all key issues," the following key issues were identified:
  Key Issue #1: How are subscribers Notified that a "Disaster Condition" applies?
  Key Issue #3: How do other PLMNs (those not subject to the disaster) indicate that they can accept "Disaster Inbound Roamers"?

The current Fifth Generation (5G) system does not support any mechanisms for the above Key Issue #1 and Key Issue #3, and enhancements are needed to introduce mechanisms to solve these key issues.

Certain aspects of the present disclosure and the embodiments described herein may provide solutions to the aforementioned or other challenges. In a first solution for the above Key Issues ("Key Issue #1" and "Key Issue #3"), a UE using a certain PLMN (hereinafter "PLMN Y"), which may be e.g. the UE's Home PLMN (HPLMN), is made aware of the failure of a PLMN Y due to a disaster condition by:
  the UE determining that there is no available cell of the PLMN Y, combined with broadcasting, by an available cell of another PLMN X, the PLMN ID of the PLMN Y in a "disaster roaming PLMN list";
  the UE camping on a cell of the PLMN Y that broadcasts a "disaster condition identified" message; or
  the UE determining that PLMN Y's core network is impacted by a disaster by:
    a registration procedure or a service request procedure in the PLMN Y failing with no response, combined with broadcasting, by an available cell of another PLMN X, the PLMN ID of the PLMN Y in the "disaster roaming PLMN list"; or
    a registration procedure or a service request procedure in the PLMN Y being rejected with a message of "5GMM cause #XXX 'disaster condition identified'";

and the UE determines that another PLMN (hereinafter "PLMN X") is available for a disaster roaming (i.e., a roaming while the PLMN Y has the disaster condition) if:
  the UE receives broadcasting, by an available cell of another PLMN X, the PLMN ID of the PLMN Y in the "disaster roaming PLMN list"; and
  the PLMN X is in UE's list of forbidden PLMNs.

In one embodiment of the first solution, the UE using a serving PLMN (PLMN Y), which may be for example the HPLMN of the UE, determines that the serving PLMN Y has a disaster condition if:
  no PLMN Y cell is available to the UE and the UE receives, from a radio access node (e.g., base station) serving a cell of the PLMN X (which is outside the UE's serving PLMN Y), a broadcast of a "disaster roaming PLMN list" including the PLMN ID of PLMN Y;
  the UE camping on a cell of the PLMN Y that broadcasts a message of "disaster condition identified"; or
  the UE determines that the core network of the PLMN Y is impacted by the disaster by:
    a registration procedure or a service request procedure in the PLMN Y failing with no response and the UE receives, from a radio access node (e.g., base station) serving a cell of PLMN X (which is outside the UE's serving PLMN Y), a broadcast of a "disaster roaming PLMN list" including the PLMN ID of PLMN Y; or
    a registration procedure or a service request procedure in the PLMN Y being rejected with a message of "5GMM cause #XXX 'disaster condition identified'".

and the UE determines that another PLMN (PLMN X) is available for the disaster roaming (i.e., roaming while PLMN Y has the disaster condition) if:
  the UE receives, from a radio access node (e.g., base station) serving a cell of PLMN X (which is outside the UE's serving PLMN Y), a broadcast of the "disaster roaming PLMN list" including the PLMN ID of PLMN Y; and
  the PLMN X is in UE's list of forbidden PLMNs.

In a second solution for the above Key Issues ("Key Issue #1" and "Key Issue #3"), a UE using a certain PLMN ("PLMN Y"), which may be e.g., a HPLMN of the UE, is made aware of the failure of the serving PLMN due to a disaster condition by:
  the UE determining there is no available cell of the PLMN Y combined with a cell of another PLMN ("PLMN X") broadcasting a Public Warning System (PWS) message:
    with a message identifier set to the disaster-roaming-possible value; and
    with the content of the PWS message containing the "disaster roaming PLMN list" including the PLMN ID of the PLMN Y;
  the UE camping on a cell of the PLMN Y that broadcasts a message of "disaster condition identified"; or
  the UE determining that the PLMN Y's core network is impacted by disaster by
    a registration procedure or a service request procedure in the PLMN Y failing with no response, combined with a cell of another PLMN ("PLMN X") broadcasting a PWS message:
      with the message identifier set to the disaster-roaming-possible value; and
      with the content of the PWS message containing the "disaster roaming PLMN list" including the PLMN ID of the PLMN Y; or a registration procedure or a service request procedure in the PLMN Y being rejected with a message of "5GMM cause #XXX 'disaster condition identified'".

and the UE determines that another PLMN ("PLMN X") is available for a disaster roaming (i.e., roaming while PLMN Y has the disaster condition) if:

the UE receives, from a radio access node (e.g., base station) serving a cell of PLMN X (which is outside the UE's serving PLMN Y), a broadcast of a PWS message,
with the message identifier set to the disaster-roaming-possible value; and
with the content of the PWS message containing the "disaster roaming PLMN list" including the PLMN ID of the PLMN Y; and the PLMN X is in UE's list of forbidden PLMNs.

Via one of the above solutions, the UE registered to a PLMN may determine that this PLMN is unable to provide a service due to a disaster condition and may instead determine another PLMN that may provide a service.

Embodiments of the present disclosure introduce a "disaster roaming PLMN list" provided by a PLMN that is capable of providing a service to subscribers of another PLMN(s) impacted by disaster conditions. The PLMN providing the disaster roaming is operational and may provide the "disaster roaming PLMN list." Also, in case of complete outage of the failing PLMN, its subscribers may deduce the disaster condition as the PLMN ID of UE's failing PLMN (which may be, e.g., the HPLMN of the UE) is included in the "disaster roaming PLMN list" received from the PLMN offering the disaster roaming. The "disaster roaming PLMN list" is received without the need to register to the alternative PLMN, i.e. functionality is assured also in case the alternative PLMN normally is forbidden for the subscriber, and therefore access would not be attempted unless the disaster roaming is offered. Additionally, the broadcasting of the "disaster condition identified" by an impacted PLMN may assist in quicker determination of failing service by UEs registered to the impacted PLMN.

Certain embodiments may provide one or more of the following technical advantage(s). One advantage to the proposed solutions is that a UE is informed of the failure of its currently used PLMN due to a disaster condition and a service may be provided in another PLMN, where the UE under normal conditions may not be allowed to receive a service from the another PLMN.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) and a 5G Core (5GC) or an Evolved Packet System (EPS) including an Evolved Universal Terrestrial RAN (E-UTRAN) and an Evolved Packet Core (EPC). In this example, the RAN includes base stations 102-1 and 102-2, which in the 5GS include NR base stations (gNBs) and optionally next generation eNBs (ng-eNBs) (e.g., LTE RAN nodes connected to the 5GC) and in the EPS include eNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5G System (5GS) is referred to as the 5GC. The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs, but the present disclosure is not limited thereto. The wireless communication devices 112 are UEs in the example embodiments described below and, as such, the wireless communication devices 112 are sometimes referred to herein as UEs 112.

As illustrated in FIG. 1, a Cell Broadcasting Entity (CBE) 114 and a Cell Broadcast Center (CBC) 116 may be connected to the core network 110. When disasters, e.g. earthquake, tsunami, or landslide, may occur, the CBE 114 notifies the CBC 116 of a warning message of the disasters. Then, the CBC 116 forwards the warning message to the core network 110.

Figure 2:
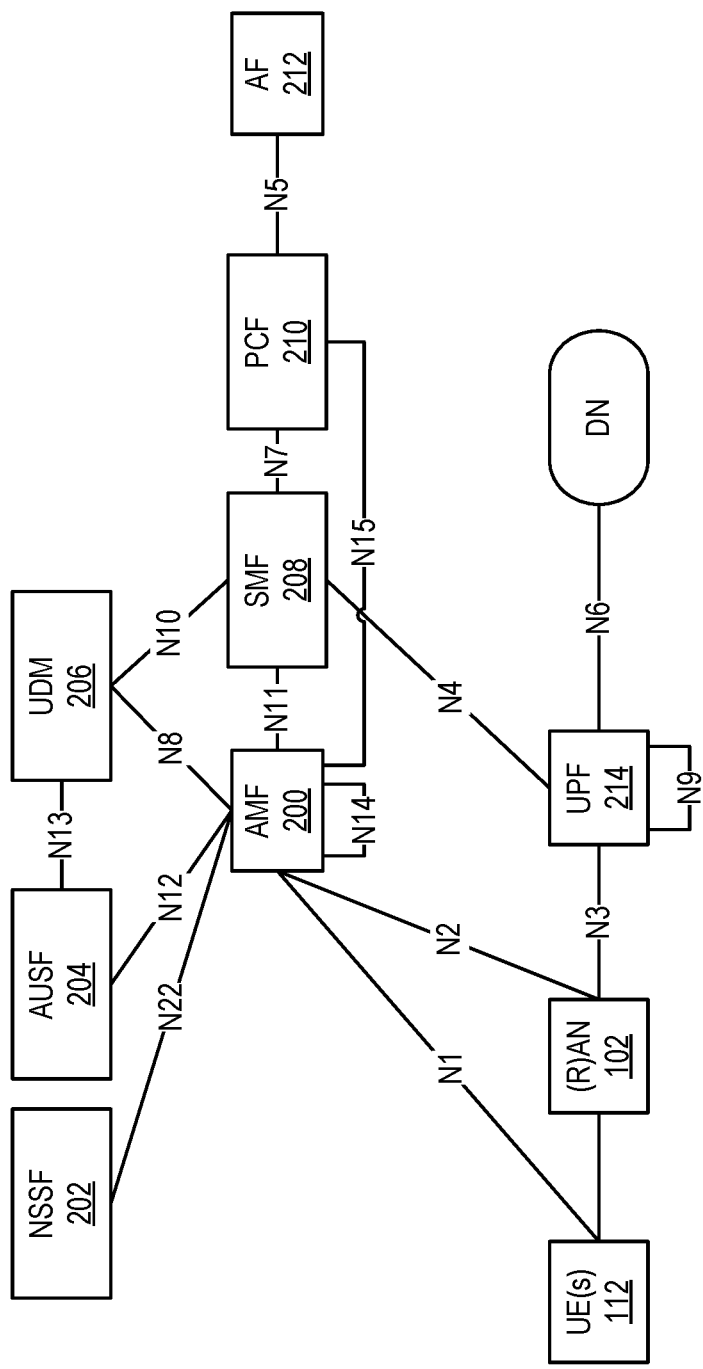
FIG. 2 illustrates a wireless communication system represented as a Fifth Generation (5G) network architecture composed of core Network Functions (NFs), where interaction between any two NFs is represented by a point-to-point reference point/interface.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of UEs 112 connected to either a RAN 102 or an Access Network (AN) as well as an AMF 200. Typically, the R(AN) 102 comprises base stations, e.g. such as eNBs or gNBs or similar. Seen from the core network side, the 5GC NFs shown in FIG. 2 include a NSSF 202, an AUSF 204, a UDM 206, the AMF 200, a SMF 208, a PCF 210, and an Application Function (AF) 212.

Reference point representations of the 5G network architecture are used to develop detailed call flows in the normative standardization. The N1 reference point is defined to carry signaling between the UE 112 and AMF 200. The reference points for connecting between the AN 102 and AMF 200 and between the AN 102 and UPF 214 are defined as N2 and N3, respectively. There is a reference point, N11, between the AMF 200 and SMF 208, which implies that the SMF 208 is at least partly controlled by the AMF 200. N4 is used by the SMF 208 and UPF 214 so that the UPF 214 can be set using the control signal generated by the SMF 208, and the UPF 214 can report its state to the SMF 208. N9 is the reference point for the connection between different UPFs 214, and N14 is the reference point connecting between different AMFs 200, respectively. N15 and N7 are defined since the PCF 210 applies policy to the AMF 200 and SMF 208, respectively. N12 is required for the AMF 200 to perform authentication of the UE 112. N8 and N10 are defined because the subscription data of the UE 112 is required for the AMF 200 and SMF 208.

The 5GC network aims at separating User Plane (UP) and Control Plane (CP). The UP carries user traffic while the CP carries signaling in the network. In FIG. 2, the UPF 214 is in the UP and all other NFs, i.e., the AMF 200, SMF 208, PCF 210, AF 212, NSSF 202, AUSF 204, and UDM 206, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 200 and SMF 208 are independent functions in the CP. Separated AMF 200 and SMF 208 allow independent evolution and scaling. Other CP functions like the PCF 210 and AUSF 204 can be separated as shown in FIG. 2. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 3:
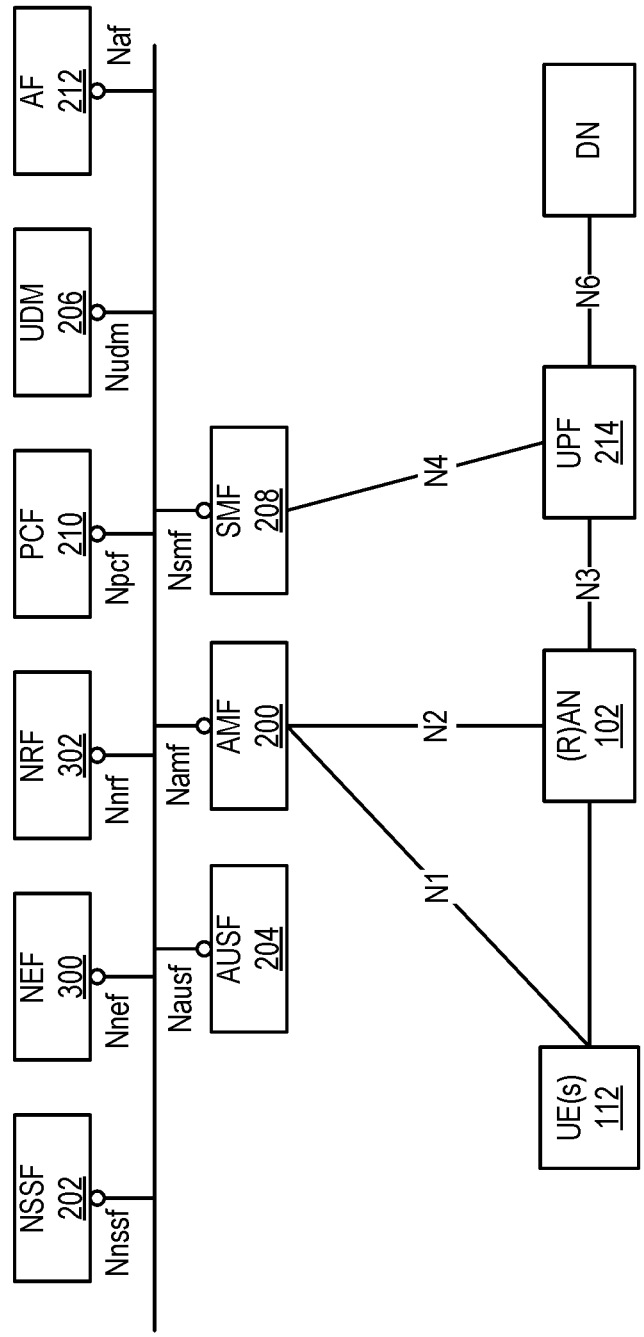
FIG. 3 illustrates a 5G network architecture using service-based interfaces between the NFs in the Control Panel (CP).

FIG. 3 illustrates a 5G network architecture using service-based interfaces between the NFs in the CP, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g. Namf for the service based interface of the AMF 200 and Nsmf for the service based interface of the SMF 208, etc. The NEF 300 and the NRF 302 in FIG. 3 are not shown in FIG. 2 discussed above. However, it should be clarified that all NFs depicted in FIG. 2 can interact with the NEF 300 and the NRF 302 of FIG. 3 as necessary, though not explicitly indicated in FIG. 2.

Some properties of the NFs shown in FIGS. 2 and 3 may be described in the following manner. The AMF 200 provides UE-based authentication, authorization, mobility management, etc. A UE 112 even using multiple access technologies is basically connected to a single AMF 200 because the AMF 200 is independent of the access technologies. The SMF 208 is responsible for session management and allocates Internet Protocol (IP) addresses to UEs. It also selects and controls the UPF 214 for data transfer. If a UE 112 has multiple sessions, different SMFs 208 may be allocated to each session to manage them individually and possibly provide different functionalities per session. The AF 212 provides information on the packet flow to the PCF 210 responsible for policy control in order to support Quality of Service (QoS). Based on the information, the PCF 210 determines policies about mobility and session management to make the AMF 200 and SMF 208 operate properly. The AUSF 204 supports authentication function for UEs or similar and thus stores data for authentication of UEs or similar while the UDM 206 stores subscription data of the UE 112. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 4:
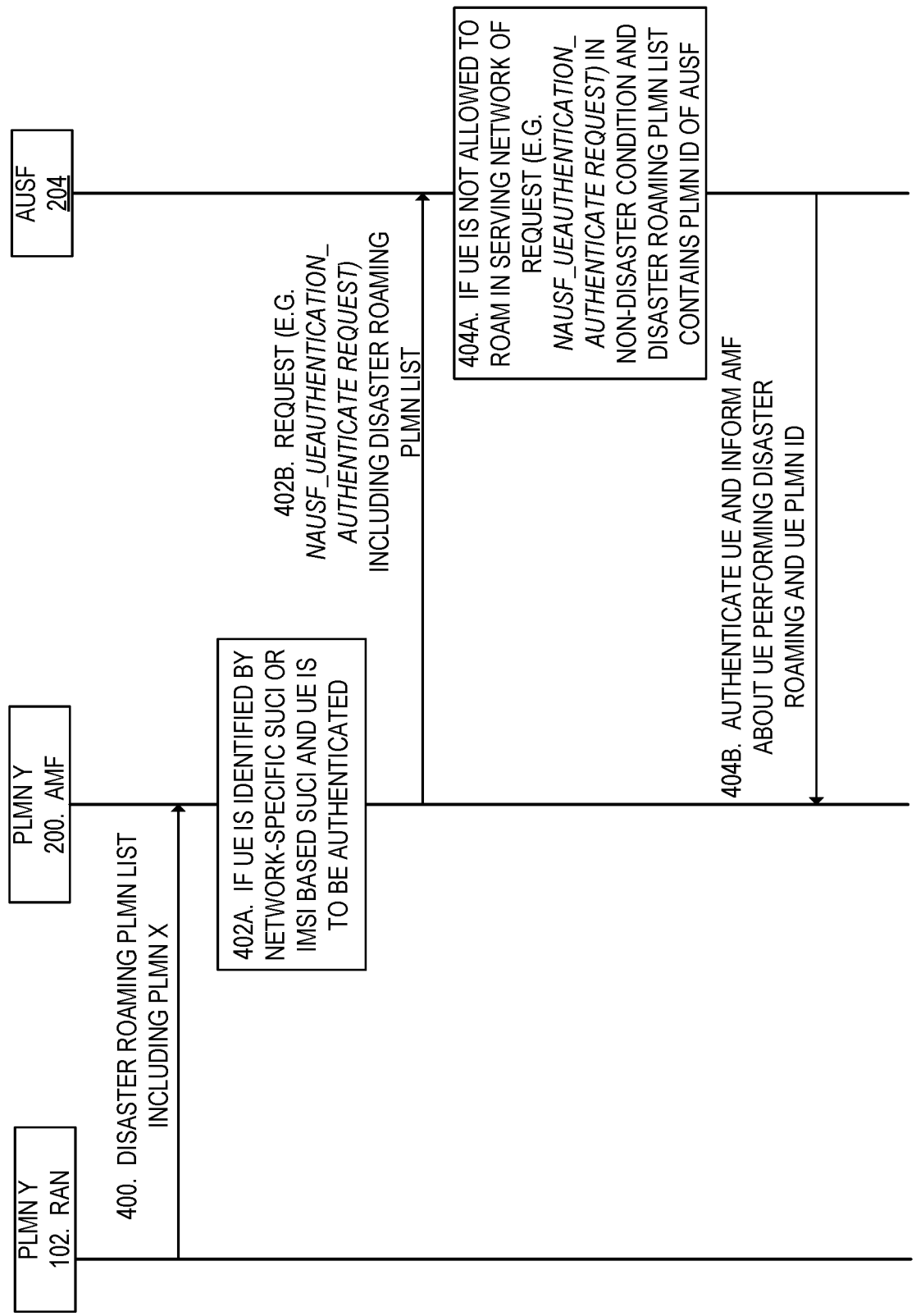
FIG. 4 illustrates the first solution of the present disclosure.
Figure 5:
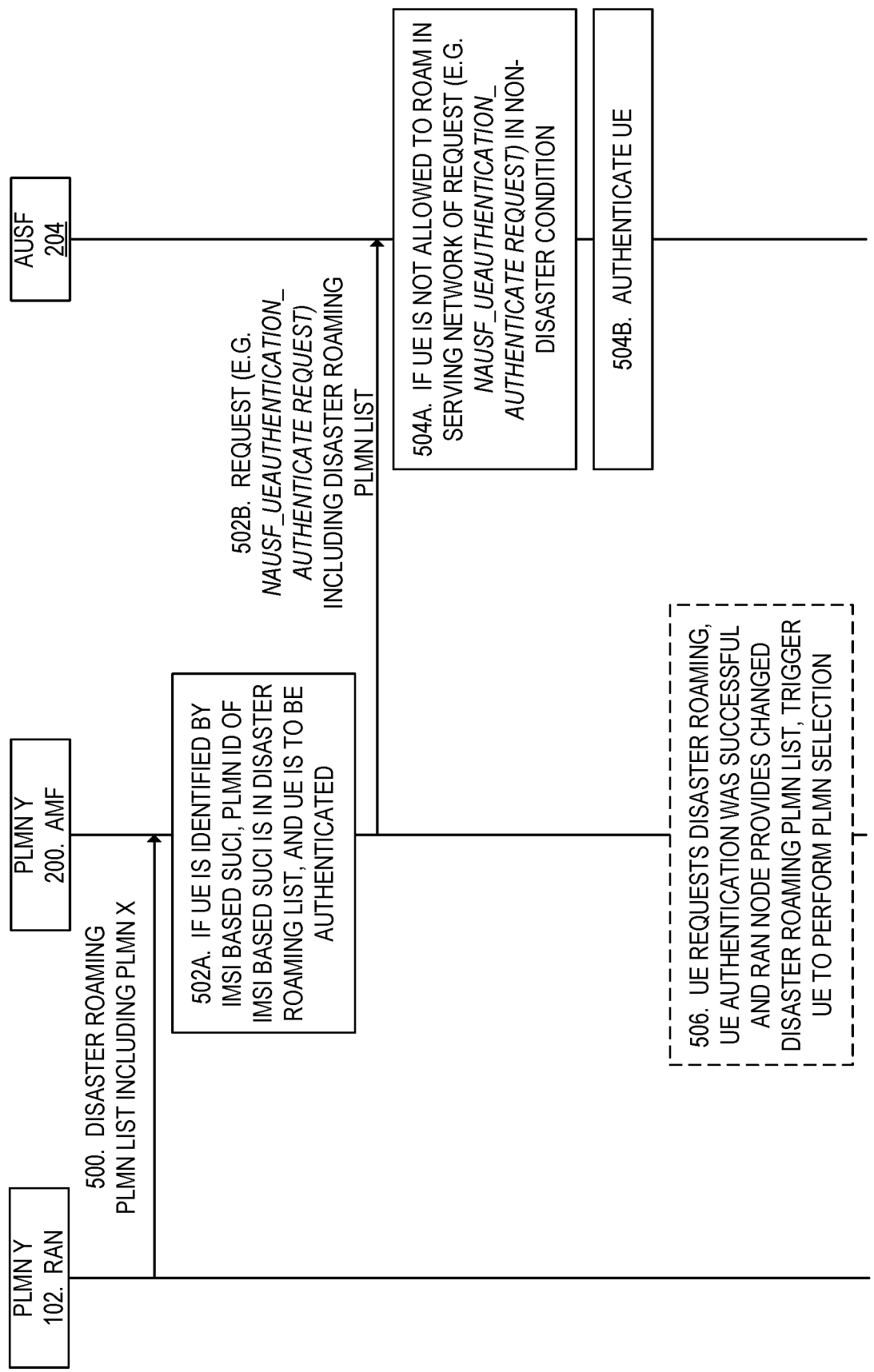
FIG. 5 illustrates a flow chart of the first solution.
Figure 6:
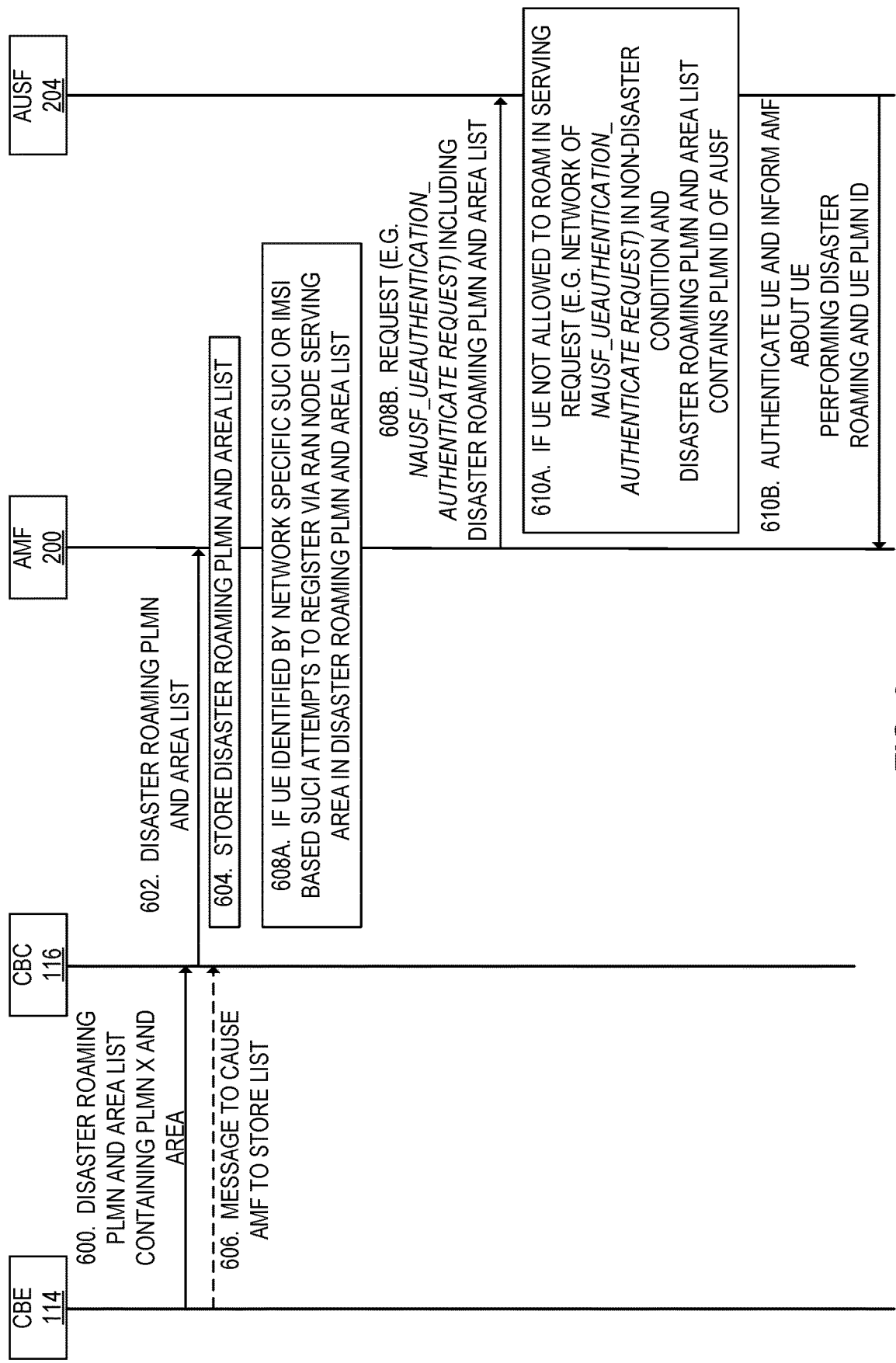
FIG. 6 illustrates the second solution of the present disclosure.
Figure 7:
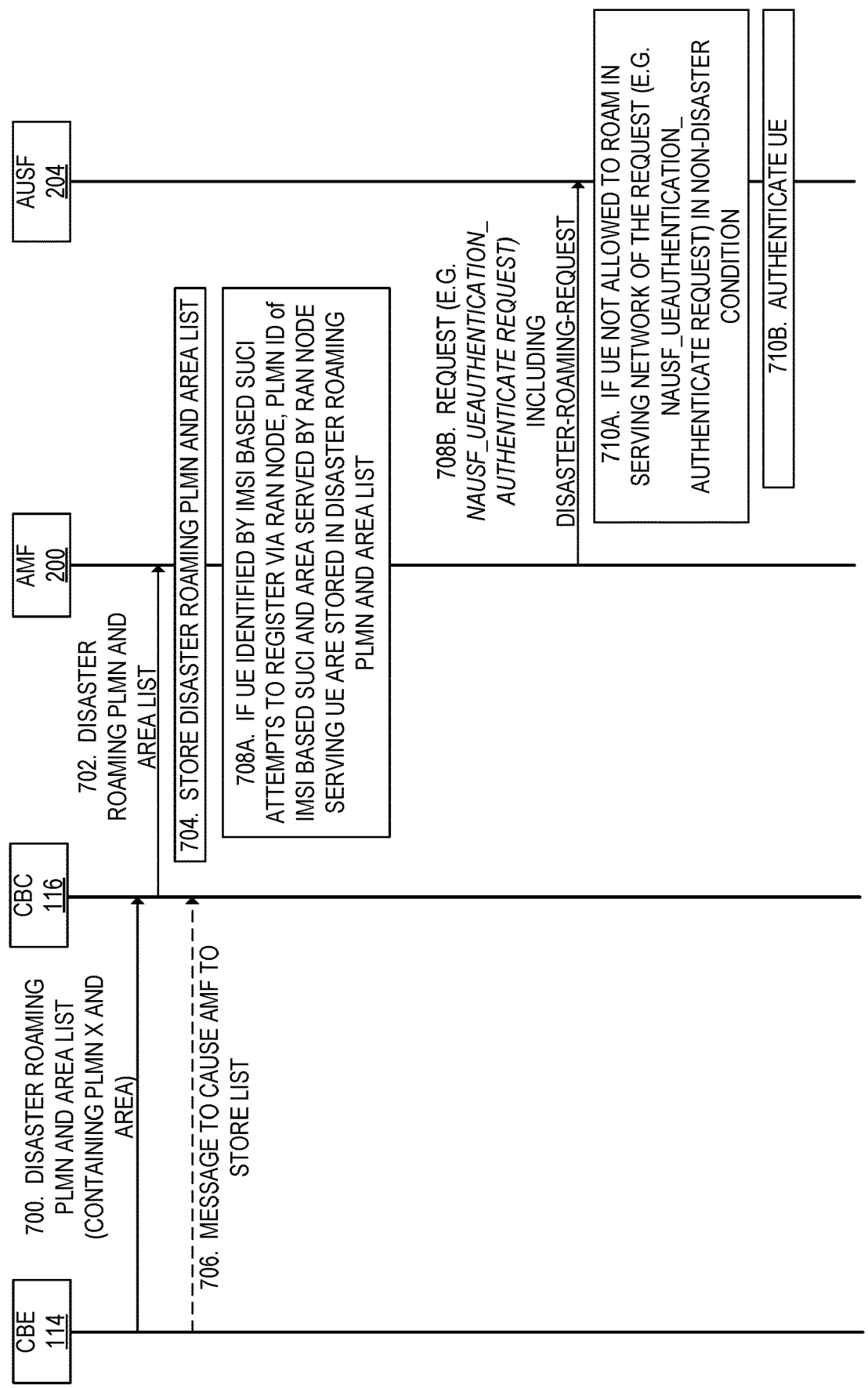
FIG. 7 illustrates a flow chart of the second solution.

Methods for a UE to determine that a HPLMN Y has a disaster condition and that another PLMN X is available to provide disaster roaming are discussed with reference to the flow diagram in FIGS. 4 through 7. FIGS. 4 and 5 relate to example embodiments of the first solution described briefly above and detailed below. FIGS. 6 and 7 relate to example embodiments of the second solution described briefly above and detailed below.

When a first PLMN ("PLMN X") is informed that another PLMN ("PLMN Y") has a disaster condition and the PLMN X is to provide disaster roaming, the PLMN X configures PLMN X's cells to broadcast a "disaster roaming PLMN list" including the PLMN ID of the PLMN Y. In one embodiment, the configuration is done using Operations and Access Management (O&AM).

In one embodiment of the first solution, the UE determines that its HPLMN Y has the disaster condition and that the PLMN X is available for the disaster roaming if:
  there is no available cell of the PLMN Y and an available cell of the PLMN X broadcasts the PLMN ID of HPLMN Y in the "disaster roaming PLMN list"; or
  the UE camps on a cell of the PLMN Y that broadcasts a message of "disaster condition identified"; or
  the UE determines that the PLMN Y's core network is impacted by a disaster by
    a registration procedure or a service request procedure in the PLMN Y failing with no response and an available cell of the PLMN X broadcasts the PLMN ID of HPLMN Y in the "disaster roaming PLMN list"; or
    a registration procedure or a service request procedure in the PLMN Y being rejected with a message of "5GMM cause #XXX 'disaster condition identified'".

In one embodiment, the UE determines that the PLMN Y's core network is impacted by a disaster e.g.:
  when a registration procedure or a service request procedure in the PLMN Y fails due to expiration of the timer T3510 or T3517, lower layer failure or a release of Non-Access Stratum (NAS) signaling connection, and the registration attempt counter or service request attempt counter is equal to 5 and an available cell of the PLMN X broadcasts the PLMN ID of the PLMN Y in the "disaster roaming PLMN list"; and/or
  when a registration procedure or a service request procedure in the PLMN Y is rejected with a message of "5GMM cause #XXX 'disaster condition identified'".

In one embodiment, the UE's determination that the PLMN Y has a "disaster condition" is cleared after timeout if determined by:
  a registration procedure or a service request procedure in the PLMN Y failing with no response and an available cell of PLMN X broadcasts the PLMN ID of HPLMN Y in the "disaster roaming PLMN list"; or
  a registration procedure or a service request procedure in the PLMN Y being rejected with a message of "5GMM cause #XXX 'disaster condition identified'".

FIG. 4 illustrates the operation of the UE 112 and various network nodes (e.g., the RAN node 102, the AMF 200) in accordance with one example embodiment of the first solution. The example embodiment of FIG. 4 assumes that the PLMN X is informed about a disaster in the PLMN Y in the area of the UE, the PLMN X is willing to provide a disaster roaming to UEs of the PLMN Y in the area, and the PLMN X sets up the RAN nodes 102 of the PLMN X in the area to broadcast a "disaster roaming PLMN list" including the PLMN ID of the PLMN Y. The procedure illustrated in FIG. 4 is as follows:

Step 400: The UE determines that UE's PLMN Y is not available (i.e., has a disaster condition). In one embodiment, the UE 112 makes this determination using one of the following alternatives A to D, which Alternative A (step 400A): The UE 112 determines that there is no available cell of the PLMN Y and, as such, determines that the PLMN Y has a disaster condition.

Alternative B (step 400B): The UE 112 camps on a cell of the PLMN Y that broadcasts a message of "disaster condition identified." In other words, the UE 112 camps on a cell of the PLMN Y and receives a broadcast from that cell, which includes information indicating that the PLMN Y is experiencing a disaster condition.

Alternative C (step 400C): The UE 112 attempts to perform a registration procedure or a service request procedure in the PLMN Y, and the registration procedure or the service request procedure in the PLMN Y fails due to expiration of a timer (e.g., timer T3510 or T3517 in 3GPP), lower layer failure or release of NAS signaling connection, and the registration attempt counter or service request attempt counter is equal to a predefined value (e.g., 5 in 3GPP).

Alternative-D (step 400D): The UE 112 determines that the PLMN Y is experiencing a disaster condition if the registration procedure or the service request procedure in the PLMN Y is rejected with a message of "5GMM cause #XXX 'disaster condition identified'".

Alternatives A through D are alternatives or optional steps within Step 1 for the UE to become aware that the PLMN Y is not available (i.e., is experiencing a disaster condition).

Step 402: The UE 112 searches for other PLMNs and discovers a cell of another PLMN X that broadcasts a "disaster roaming PLMN list" including a PLMN ID of the PLMN Y. In one embodiment, the UE 112 is not normally permitted to use the PLMN X (e.g., PLMN X is in the forbidden PLMN list of the UE).

Step 404: Based on Steps 400 and 402, the UE 112 determines that the PLMN Y has a disaster condition and that the PLMN X is available for the disaster roaming. Stated differently, in Alternative A and Alternative C of Step 400, the UE 112 is unable to communicate with the PLMN Y but does not affirmatively learn that the PLMN Y is in a disaster condition until receiving the "disaster roaming PLMN list" in Step 402. In Alternative B and Alternative D of Step 400, the UE 112 is affirmatively informed of the disaster condition in the PLMN Y. In all Alternatives of Step 400, the UE 112 becomes aware that the PLMN X is available for the disaster roaming for the UE 112 when the UE 112 receives the "disaster roaming PLMN list" in Step 402.

Step 406: As the UE 112 determined that the PLMN Y has the disaster condition and that the PLMN X is available for the disaster roaming, the UE 112 attempts to register with the PLMN X. In one embodiment, this is done despite the fact that the UE 112 is otherwise not able to use the PLMN X (e.g., the PLMN X is in a forbidden PLMN list of the UE 112). In one embodiment, the UE 112 attempts to register with the PLMN X only if there is no other PLMN that is available and allowable using non-disaster roaming.

FIG. 5 illustrates a method performed by a network node (e.g., the RAN node 102 and the AMF 200) in the PLMN X referred to in FIG. 4. The method in FIG. 5 includes the following steps:

Step 500: Receiving, in a first PLMN (PLMN X), information about a disaster condition in a second PLMN (PLMN Y) in an area of a UE;

Step 502: Determining, in the first PLMN, a willingness to provide a disaster roaming to UEs 112 of the second PLMN in the area; and Step 504: Setting up RAN nodes (e.g., base stations 102) in the first PLMN to broadcast a "disaster roaming PLMN list" including a PLMN ID of the second PLMN.

When the CBE 114 is informed that the PLMN Y has a disaster condition and the CBE 114 decides to provide the disaster roaming for UEs 112 (registered at the PLMN Y) in the PLMN X, the CBE 114 will trigger the CBC 116 to broadcast a PWS message in the PLMN X. The PWS message comprises (a) a message Identifier that is set to a newly reserved disaster-roaming-possible value; and (b) PWS message content, which contains the "disaster roaming PLMN list," including the PLMN ID of the PLMN Y.

The UE 112 determines that its PLMN Y (which may be its HPLMN) has a disaster condition if:

the UE 112 determines that there is no available cell of the PLMN Y and an available cell of another PLMN X broadcasts a PWS message, which includes (a) a message Identifier that is set to a newly reserved disaster-roaming-possible value; and (b) PWS message content, which contains the "disaster roaming PLMN list," including the PLMN ID of the PLMN Y, or the UE 112 camps on a cell of the PLMN Y that broadcasts a message of "disaster condition identified"; or the UE 112 determines that the PLMN Y's core network is impacted by a disaster by:
  a registration procedure or a service request procedure in the PLMN Y failing with no response and an available cell of another PLMN X broadcasts the PWS message; or
  a registration procedure or a service request procedure in the PLMN Y being rejected with a message of "5GMM cause #XXX 'disaster condition identified.'"

In one embodiment, the UE 112 determines that the PLMN Y's core network is impacted by a disaster e.g.:
  when a registration procedure or a service request procedure in the PLMN Y fails due to expiration of a timer (e.g., the timer T3510 or T3517 in 3GPP), lower layer failure or release of NAS signaling connection, and the registration attempt counter or service request attempt counter is equal to 5 and an available cell of another PLMN X broadcasts a PWS message:
    with the Message Identifier set to the disaster-roaming-possible value; and
    with the content of the PWS message containing the "disaster roaming PLMN list" including PLMN ID of PLMN Y; and/or
  when a registration procedure or a service request procedure in the PLMN Y is rejected with a message of "5GMM cause #XXX 'disaster condition identified.'"

In one embodiment, the UE's determination that the PLMN Y's core network has the disaster condition is cleared after timeout if determined by:
  a registration procedure or a service request procedure in the PLMN Y failing with no response and an available cell of PLMN X broadcasts the PWS message with the Message Identifier set to the disaster-roaming-possible value; and with the content of the PWS message containing the "disaster roaming PLMN list" including PLMN ID of PLMN Y; and/or a registration procedure or a service request procedure in the PLMN Y being rejected with a message of "5GMM cause #XXX 'disaster condition identified.'"

FIG. 6 illustrates the operation of a UE 112 and a number of network nodes (e.g., the RAN node 102, AMF 200) in accordance with one example embodiment of the second solution. The example shown in FIG. 6 assumes that the CBE 114 is informed about the disaster in the PLMN Y in area of the UE 112, decides that PLMN X is to provide disaster roaming to UEs 112 of the PLMN Y in the area, and instructs the PLMN X to send the PWS message comprising (a) a message Identifier that is set to a newly reserved disaster-roaming-possible value; and (b) PWS message content, which contains the "disaster roaming PLMN list," including the PLMN ID of the PLMN Y.

In one embodiment, the CBE 114 instructs the PLMN X to send the PWS message using the flow for distribution of PWS messages in NG-RAN, as described in Figure 9.1.3.5.2-1 of 3GPP TS 23.041 v17.0.0.

The procedure of FIG. 6 is as follows:

Step 1: The UE determines that the UE's PLMN Y (which may be its HPLMN) is not available using one of the following alternatives:

Alternative A: The UE determines that there is no available cell of PLMN Y and, as such, determines that PLMN Y has a disaster condition.

Alternative B: The UE camps on a cell of PLMN Y which broadcasts "disaster condition identified". In other words, the UE camps on a cell of PLMN Y and receives a broadcast from that cell that includes information that indicates the PLMN Y is experiencing a disaster condition.

Alternative C: The UE attempts to perform registration or service request procedure in PLMN Y and the registration or service request procedure in PLMN Y fails due to expiration of a timer (e.g., timer T3510 or T3517 in 3GPP), lower layer failure or release of NAS signaling connection, and the registration attempt counter or service request attempt counter is equal to a predefined value (e.g., 5).

Alternative D: The UE determines that PLMN Y is experiencing a disaster condition if registration or service request procedure in HPLMN Y is rejected with 5GMM cause #XXX "disaster condition identified".

Alternatives A through D are alternatives or optional steps within Step 1 in which the UE becomes aware that the PLMN Y is not available (i.e., is experiencing a disaster condition).

Step 2: The UE searches for other PLMNs and discovers a cell of another PLMN X via which a PWS message:

with the Message Identifier set to the disaster-roaming-possible value; and with the content of the PWS message containing the "disaster roaming PLMN list" including PLMN ID of PLMN Y, is broadcast. In one embodiment, the UE is not normally permitted to use PLMN X (e.g., PLMN X is in forbidden PLMN list of the UE).

Step 3: Based on Steps 1 and 2, the UE determines that PLMN Y has "disaster condition" and that the PLMN X is available for disaster roaming.

Stated differently, in Alternative A and Alternative C in Step 1, the UE is unable to communicate with the PLMN Y but does not affirmatively learn that the PLMN Y is in a disaster condition until receiving the disaster roaming PLMN list in Step 2. In Alternative B and Alternative D, in Step 1, the UE is affirmatively informed of the disaster condition in the PLMN Y. In all Alternatives of Step 1, the UE becomes aware that the PLMN X is available for disaster roaming for the UE when the UE receives the disaster roaming PLMN list in Step 2.

Step 4: As the UE determined that PLMN Y has a "disaster condition" and that PLMN X is available for disaster roaming, the UE attempts to register with PLMN X. In one embodiment, this is done despite the fact that the UE is otherwise not able to use PLMN X (e.g., PLMN X is in forbidden PLMN list of the UE). In one embodiment, the UE attempts to register with the PLMN X only if there is no other PLMN which is available and allowable using non-disaster roaming method of the CBE 114 referred to in FIG. 6. This method may be performed by one or more network nodes that provide the functionality of the CBE 114 described herein. The method in FIG. 7 includes:

Step 700: Receiving, in a CBE 114, information about a disaster condition in a second PLMN in an area of a UE 112;

Step 702: Deciding, in the CBE 114, that a first PLMN is to provide disaster roaming to UEs of the second PLMN in the area; and Step 704: Instructing the first PLMN to broadcast a PWS message comprising (a) a disaster roaming PLMN list and (b) a message identifier set to the disaster-roaming-possible value.

Figure 8:
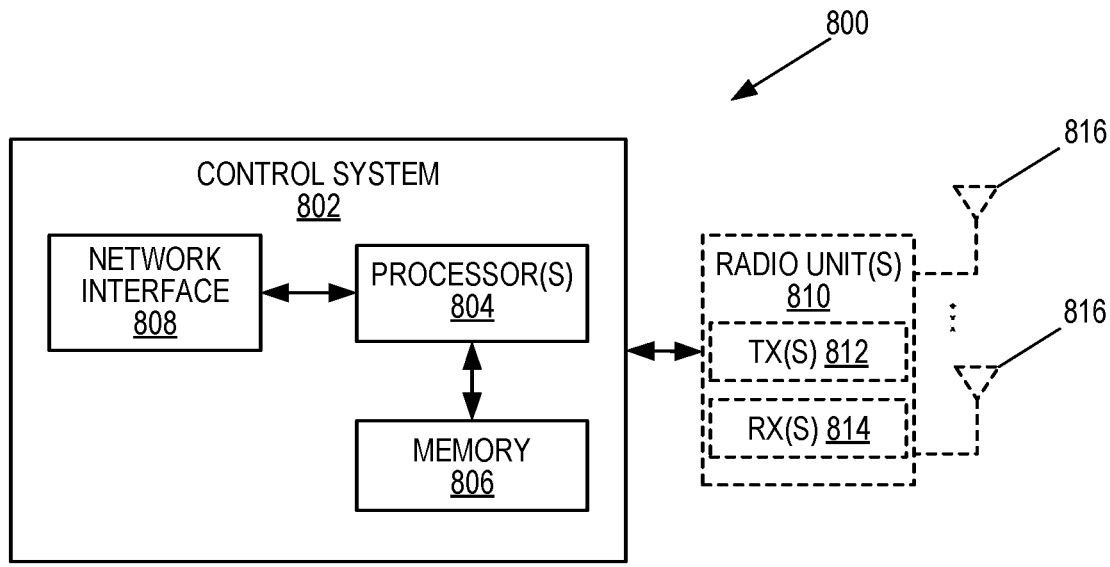
FIG. 8 illustrates a schematic block diagram of a network node according to some embodiments of the present disclosure.

FIG. 8 is a schematic block diagram of a network node 800 according to some embodiments of the present disclosure. Optional features are represented by dashed boxes. The network node 800 may be, for example, a RAN node (also referred to herein as a radio access node) such as e.g. a base station 102 or 106 or a network node that implements all or part of the functionality of the base station 102 described herein or a network node that performs the functionality of some other network entity (e.g., the CBE 114 or CBC 116) as described herein. As illustrated, the network node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, if the network node 800 is a radio access node, the network node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of the network node 800 as described herein (e.g., one or more functions of a RAN node or other network entity such as, e.g., the CBC 116 or the CBE 114 as described herein). In some embodiments, the function(s) are implemented in software that is stored, e.g., in the memory 806 and executed by the one or more processors 804.

FIG. 9 is a schematic block diagram that illustrates a virtualized embodiment of the network node 800 according to some embodiments of the present disclosure. Again, optional features are represented by dashed boxes. As used herein, a "virtualized" network node is an implementation of the network node 800 in which at least a portion of the functionality of the network node 800 is implemented as a virtual component(s) (e.g., via a virtual machine(s) executing on a physical processing node(s) in a network(s)). As illustrated, in this example, the network node 800 includes one or more processing nodes 900 coupled to or included as part of a network(s) 902. Each processing node 900 includes one or more processors 904 (e.g., CPUs, ASICs, FPGAs, and/or the like), memory 906, and a network interface 908. If the network node 800 is a radio access node, the network node 800 may include the control system 802 and/or the one or more radio units 810, as described above. The control system 802 may be connected to the radio unit(s) 810 via, for example, an optical cable or the like. If present, the control system 802 or the radio unit(s) are connected to the processing node(s) 900 via the network 902.

In this example, functions 910 of the network node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the network node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of the network node 800 or a node (e.g., a processing node 900) implementing one or more of the functions 910 of the network node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
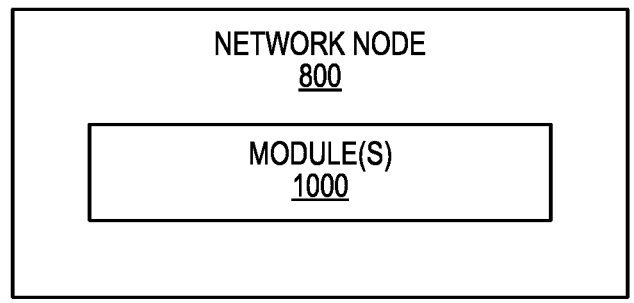
FIG. 10 illustrates a schematic block diagram of a network node according to some embodiments of the present disclosure.

FIG. 10 is a schematic block diagram of the network node 800 according to some other embodiments of the present disclosure. The network node 800 includes one or more modules 1000, each of which is implemented in software. The module(s) 1000 provide the functionality of the network node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
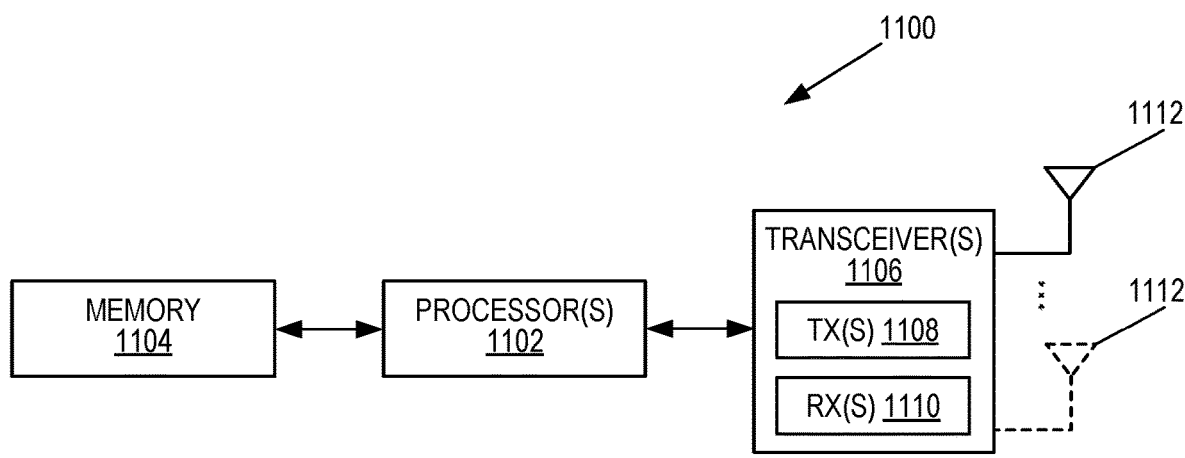
FIG. 11 illustrates a schematic block diagram of a wireless communication device according to some embodiments of the present disclosure.

FIG. 11 is a schematic block diagram of a wireless communication device 1100 according to some embodiments of the present disclosure. The wireless communication device 1100 may be, e.g., the wireless communication device 112 or UE described above. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the wireless communication device 1100 described above (e.g., one or more functions of the wireless communication device 112 or UE described above) may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

Figure 12:
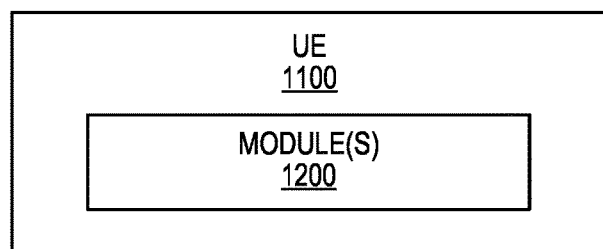
FIG. 12 illustrates a schematic block diagram of the wireless communication device according to some embodiments of the present disclosure.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory). FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GMM Fifth Generation System Mobility Management
5GS Fifth Generation System
AF Application Function
AMF Access and Mobility Function
AN Access Network
ASIC Application Specific Integrated Circuit
AUSF Authentication Server Function
CBC Cell Broadcast Center
CBE Cell Broadcasting Entity
CP Control Plane
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-CU New Radio Base Station Central Unit
gNB-DU New Radio Base Station Distributed Unit
HPLMN Home Public Land Mobile Network
HSS Home Subscriber Server
IMSI International Mobile Subscriber Identity
IoT Internet of Things
IP Internet Protocol
LTE Long Term Evolution
MME Mobility Management Entity
MTC Machine Type Communication
NAS Non-Access Stratum
NEF Network Exposure Function
NF Network Function
NR New Radio
NRF Network Function Repository Function
NSSF Network Slice Selection Function
O&AM Operations and Access Management
PC Personal Computer
PCF Policy Control Function
P-GW Packet Data Network Gateway
PLMN Public Land Mobile Network
PWS Public Warning System
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

The invention claimed is:

1. A User Equipment, UE, comprising:
one or more transmitters;
one or more receivers; and
processing circuitry associated with the one or more transmitters and the one or more receivers, the processing circuitry configured to cause the UE to:
receive a disaster roaming PLMN list from a second PLMN, the disaster roaming PLMN list comprising a PLMN Identifier, ID, of a first PLMN experiencing a disaster condition;
determine that the first PLMN is not available due to a disaster condition, based on the disaster roaming PLMN list received from the second PLMN;
determine that the second PLMN is available for disaster roaming, after receiving the disaster roaming PLMN list from the second PLMN; and
attempt to register with the second PLMN, responsive to determining that the first PLMN is not available due to the disaster condition and determining that the second PLMN is available for disaster roaming,
wherein the processing circuitry is further configured to cause the UE to:
transmit at least one of a registration request or a service request to the first PLMN;
not receive a response to the registration request or service; and
determine that a PLMN Identifier, ID, of the first PLMN is comprised in the disaster roaming PLMN list.

2. The UE of claim 1, wherein the disaster roaming PLMN list is received in a broadcast on a cell in the second PLMN (PLMN X).

3. The UE of claim 1, wherein the disaster roaming PLMN list is received in a public warning system, PWS, message from a cell in the second PLMN.

4. The UE of claim 3, wherein the PWS message comprises (a) a message identifier set to a value that indicates that disaster roaming is possible on the second PLMN (PLMN X) and (b) content that comprises the disaster roaming PLMN list.

5. The UE of claim 1, wherein the processing circuitry is further configured to cause the UE to determine that the second PLMN is available for disaster roaming based on the disaster roaming PLMN list.

6. The UE of claim 1, wherein, in order to determine that the first PLMN is not available due to the disaster condition, the processing circuitry is further configured to cause the UE to:
determine that there is no available cell of the first PLMN (PLMN Y); and
determine that a PLMN Identifier, ID, of the first PLMN is comprised in the disaster roaming PLMN list.

7. The UE of claim 1, wherein, in order to determine that the first PLMN is not available due to a disaster condition, the processing circuitry is further configured to cause the UE to:
transmit a registration request to the first PLMN;
receive a rejection of the registration request comprising an indication of the disaster condition.

8. The UE of claim 1, wherein, in order to determine that the first PLMN is not available due to the disaster condition, the processing circuitry is further configured to cause the UE to:
transmit a service request to the first PLMN;
receive a rejection of the service request comprising an indication of the disaster condition.

9. The UE of claim 1, wherein, in order to determine that the first PLMN is not available due to the disaster condition, the processing circuitry is further configured to cause the UE to:
    camp on a cell of the first PLMN; and
        receive a broadcast on the cell that comprises information that indicates that a disaster condition exists on the first PLMN.

10. The UE of claim 1, wherein, in order to determine that the first PLMN is not available due to a disaster condition, the processing circuitry is further configured to cause the UE to:
    transmit a registration request to the first PLMN; and
        receive a registration reject from the first PLMN including a message indicating that a disaster condition is identified.

11. The UE of claim 1, wherein, in order to determine that the first PLMN is not available due to the disaster condition, the processing circuitry is further configured to cause the UE to:
    transmit a service request to the first PLMN; and
        receive a service reject from the first PLMN including a message of indicating that a disaster condition is identified.

12. The UE of claim 1, wherein the UE is not otherwise permitted to use the second PLMN.

\* \* \* \* \*